Jan. 18, 1966 A. E. LARSEN 3,229,931
EMERGENCY REMOVAL OF AIRCRAFT SUSTAINING MEANS
Filed July 20, 1964 3 Sheets-Sheet 1

INVENTOR.
AGNEW E. LARSEN
BY Harry M. Saragovitz,
Edward J. Kelly, Herbert Berl &
S. Dubroff
ATTORNEYS Jan. 18, 1966     A. E. LARSEN     3,229,931

EMERGENCY REMOVAL OF AIRCRAFT SUSTAINING MEANS

Filed July 20, 1964     3 Sheets-Sheet 2

INVENTOR.
AGNEW E. LARSEN
BY Harry M. Saragovitz,
Edward J. Kelly, Herbert Berl,
& S. Dubroff
ATTORNEYS Jan. 18, 1966  A. E. LARSEN  3,229,931
EMERGENCY REMOVAL OF AIRCRAFT SUSTAINING MEANS
Filed July 20, 1964  3 Sheets-Sheet 3

INVENTOR.
AGNEW E. LARSEN
ATTORNEYS

United States Patent Office 3,229,931
Patented Jan. 18, 1966

3,229,931
EMERGENCY REMOVAL OF AIRCRAFT
SUSTAINING MEANS
Agnew E. Larsen, New Britain, Pa., assignor to the United States of America as represented by the Secretary of the Army
Filed July 20, 1964, Ser. No. 384,007
14 Claims. (Cl. 244—17.11)
(Granted under Title 35, U.S. Code (1952), sec. 266)

The invention described herein may be manufactured and used by or for the Government for governmental purposes without the payment to me of any royalty thereon.

This invention relates to aircraft having rotatable sustaining means and, more particularly, to helicopters which are so constructed as to be adaptable for emergency use thereon of normal substantially upward occupant-set ejection apparatus.

Fixed wing aircraft for the most part easily lend themselves to employment of what may be considered conventional substantially vertical upward ejection apparatus for the occupant(s) and/or seat when the craft becomes disabled.

Heretofore, such vertical ejection apparatus has not been employable in helicopters, primarily due to the obstructing presence of rotating blades directly above the occupant-seat location.

It is a primary object of the present invention to provide a helicopter construction in which it is feasible to employ conventional vertical upward occupant-seat ejection apparatus by removal of aforementioned obstructions.

Another object of the invention is to provide such a helicopter with means for removing its sustaining rotating blades from the operational path of the occupant-seat ejection means when the craft encounters insurmountable difficulties.

A further object of the invention is to provide an arrangement wherein a minimum amount of demolition energy is required to simultaneously remove the multiple rotating blades.

A still further object of the invention is to provide the arrangement with a rotor hub construction that is sufficiently durable during normal operation and yet has areas of minimum strength so as to fracture at predetermined locations facilitating or causing blade removal should the requirement be necessary.

In one aspect of the invention an aircraft having rotatable sustaining means which obstructs the operational path of vertically upward occupant-seat ejection means, includes means for driving the rotatable sustaining means and has ballistic charge means within the drive means for rapid removal of the sustaining means to clear the path for emergency actuation of the ejection means.

In another aspect of the invention the ballistic charge means is embedded within the craft's rotor hub at predetermined locations adjacent hub portions each carrying a rotor blade, such as when the charge is ignited the hub portions are demolished and their corresponding blades discarded to provide the required clearance.

These and other objects, advantages and features will become apparent from the following description and associated drawings in which.

Figure 1:
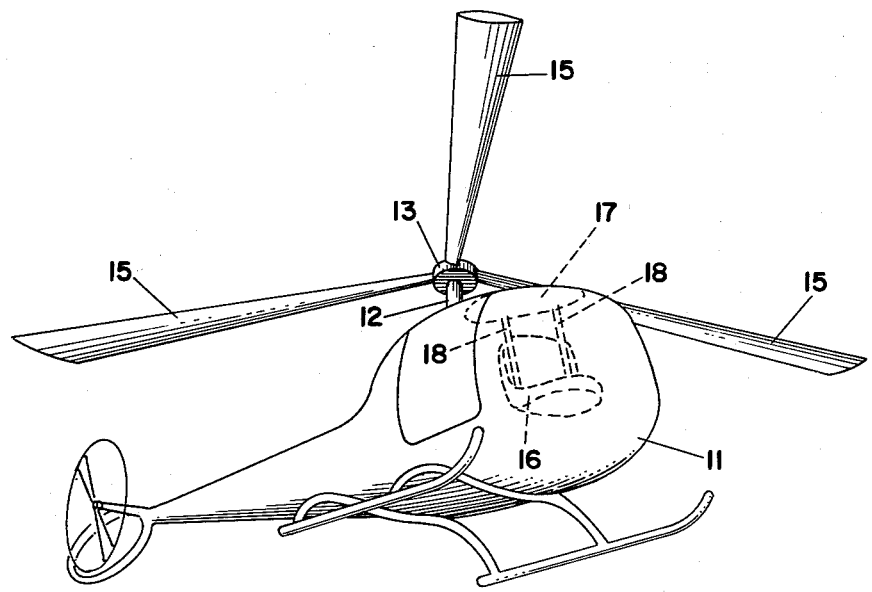
FIG. 1 is a perspective view of an aircraft to which the principles of the invention are associated.

A typical form of aircraft to which the invention applies is shown in FIG. 1 as a helicopter 11 having a well-known form of drive means including rotor shaft 12 which is drivingly connected to a rotor hub construction 13. The rotor hub is provided with a plurality of pairs of suitably apertured extensions 14 forming attaching or securing means for corresponding rotor blades or rotatable sustaining means 15.

The occupant-seat arrangement 16 generally is located below the rotary blades 15 and without benefit from the principles of the present invention, it would be unthinkable to make use of vertical upward ejection means of the type found on many fixed wing aircraft, since the operational upward path would conflict with the path of the rotating blades. An appropriate upper hatch or door means 17, preferably removable for emergency escape purposes by ballistic means (not shown), is provided in an overlying clear path relation to the occupant-seat structure as governed by fuselage mounted track means 18 which form a part of the conventional ballistic or catapult ejection means.

Figure 3:
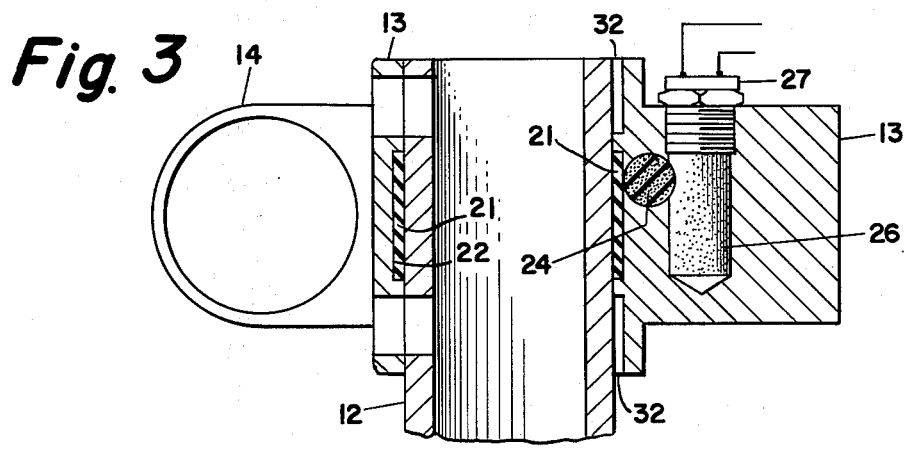
FIG. 3 is a sectional view taken along line 3—3 of FIG. 2.

The preferred rotor hub arrangement (FIGS. 2, 3) is mounted upon the rotor shaft 12, in such a manner as to be normally drivingly connected thereto, by any suitable means. At the time of assembling the parts that form the hub construction, the split bushing explosive element 21 is inserted in an annular groove 22 formed in the hub 13 so as to circumferentially extend between the hub and shaft. A plurality of horizontally disposed explosive charges 24 are positioned in tapped bores 23 are preformed or designed at predetermined spaced locations so that the loaded charges 24 tangentially intersect the annular propellant ring 21 as well as corresponding vertically arranged propellant charges 26. At least one of the charges 26 is sealed in its vertical bore by an ignition element 27. The other charges 26 may be sealed in their vertical bores by any suitable sealing means or, if desired, by additional ignition elements 27 if they be properly interconnected to provide an ignition means that fires in unison upon an appropriate signal initiated by the pilot or an occupant of the craft.

Figure 2:
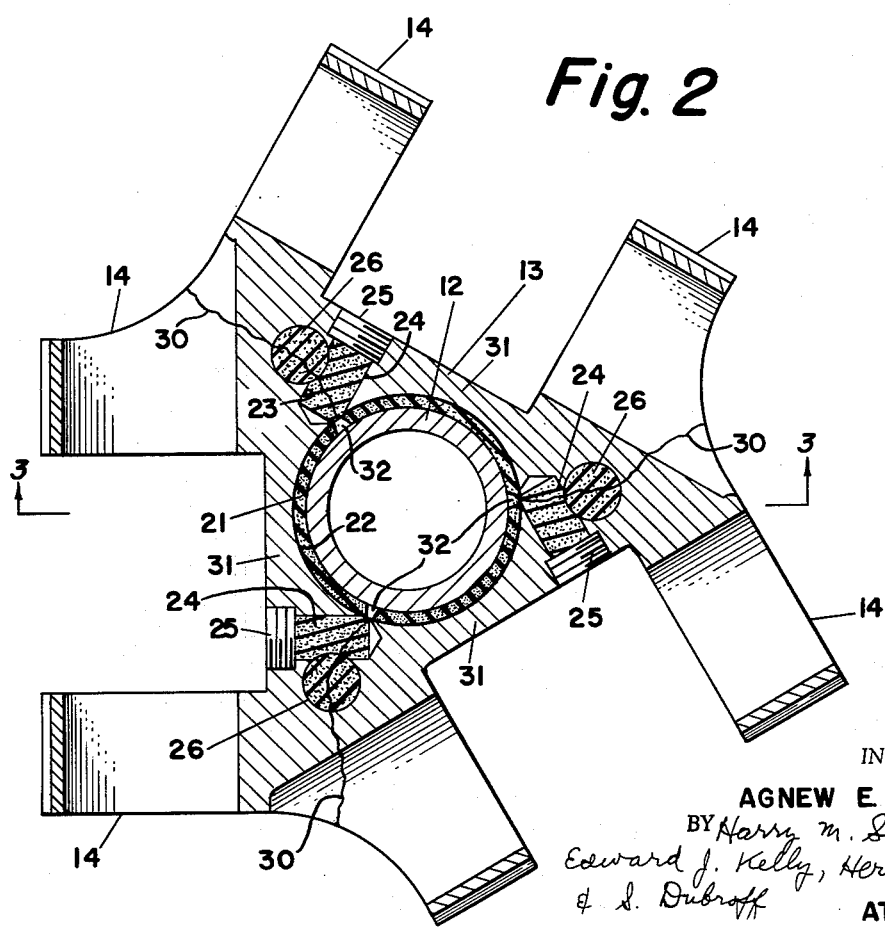
FIG. 2 is a transverse sectional view of a preferred rotor hub construction in the craft of FIG. 1.

In the preferred hub construction of FIG. 2, each of the groups of intersecting charges are so positioned with respect to the hub cross-sectional area and contour intermediate adjacent ends of corresponding blade attaching means 14, such that upon ballistic detonation of a required or predetermined minimum amount of explosive charge, the hub will crack substantially along lines 30 at areas of durable yet minimum strength, to thus form segmental hub portions 31 each connected to its respective blade 15. Obviously, the extremely high centrifugal force exerted by each rotating blade upon their respective cracked hub portions will insure rapid demolition of the hub and discarding of the individual blades with their corresponding hub portions 31. While it is preferred that a minimum quantity of charge means be employed, it is recognized that use of a larger amount may preclude the necessity for centrifugal forces to complete the blade dismemberments. Also, the annular propellant ring 21 could be modified or even eliminated to present separate charge means within the hub outer periphery at predetermined angularly spaced locations, so long as provision is made to obtain unison ignition of the multiple charges.

Preferably, pre-formed notches such as vertically extending V-slots 32 (FIGS. 2, 3) are provided axially along the hub 13 adjacent each group of charges to aid the precise predetermination of proposed fracture lines 30.

Thus, when the aircraft 11, provided with the foregoing hub arrangement and conventional vertically upward occupant-seat ejection apparatus is confronted by insurmountable difficulties or is otherwise disabled in flight, the various explosive charges may be ignited and the hub, for the most part, and its associating rotating blades rapidly removed, to provide adequate clearance for the operational path of the ejection apparatus.

Figure 4:
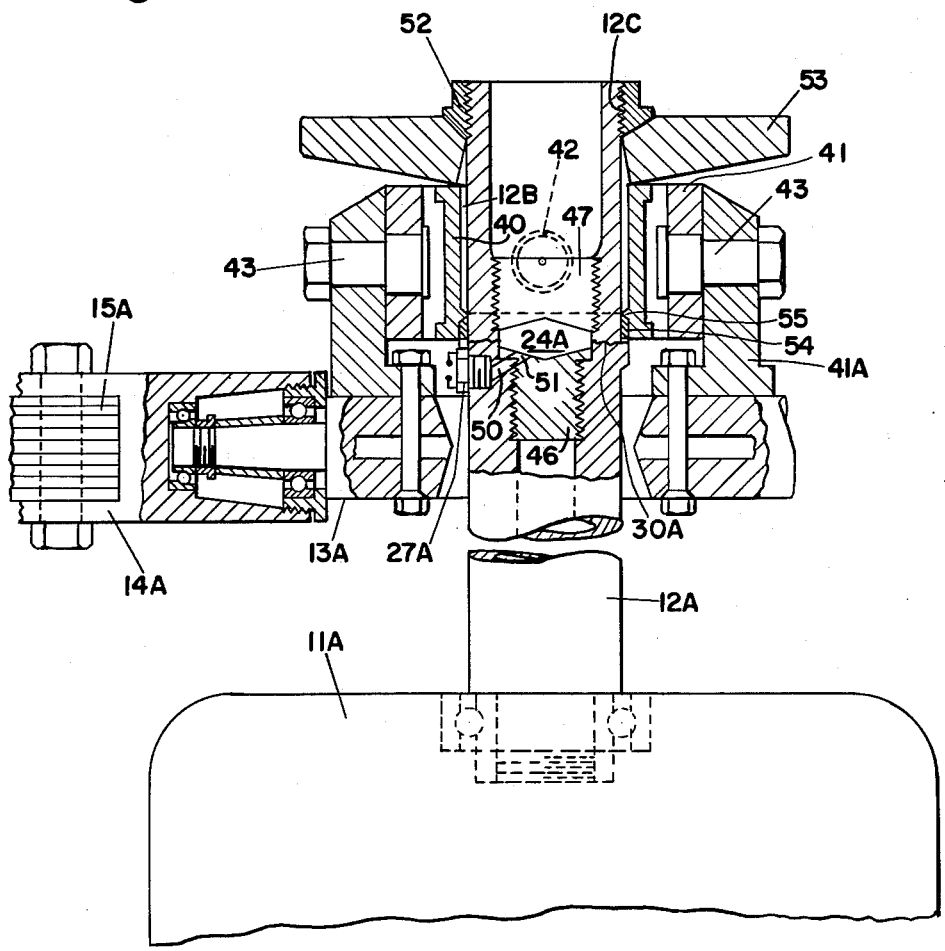
FIG. 4 is an elevation sectional view of a modified form of the invention.

In the alternate embodiment of FIG. 4 the teetering rotor hub 13A, having a pair of rotatable blades or sustaining means 15A suitably connected to its appropriate mounting fork or attaching means 14A on the blade axis, is mounted in a different manner upon the rotor shaft 12A of a similar aircraft 11A of the type shown in FIG. 1.

The rotatable shaft 12A is longitudinally or axially splined at 12B on its outer periphery to receive a mating splined inner surface of drive trunnion 40 which is connected via gimbal ring 41 and its support bracket 41A to hub 13A. The usual gimbal spindle connections are shown at 42 and 43, the former coincident with the teetering axis.

The rotor shaft 12A is hollow and has stepped concentric threads to receive a lower and smaller, flanged plug 46 which provides a sealed base for the explosive charge 24A, and an upper sealing plug 47 for the charge 24A. Juxtapositioned and below the charge 24A, the rotor shaft 12A is appropriately tapped to receive an ignition element 27A. A communicative passage between the ignition means 27A and ballistic charge 24A is provided by the inclined hole portions 50, 51, previously drilled in the shaft 12A and installed lower sealing plug 46, respectively. The upper end of the rotor shaft 12A has a threaded outer surface 12C to receive an end thrust restraining nut 52 which functions through abutment ring 53 and trunnion 40 to maintain the rotor hub 13A and its associated parts in their proper elevational position upon the rotor shaft as located by split ring 54 in annular groove 55.

When the craft becomes disabled, actuation of the ignition element 27A detonates the ballistic charge 24A which will crack or rupture the rotor shaft transversely along lines 30A while exerting at least an initial axial or upward force upon the thrust restraining means 52. The usual upward reacting lift force of the operatively rotating blades or sustaining means 15A will insure complete rapid removal of the entire rotor assembly including the hub construction and its associated rotating parts along with the upper portion of the rotor shaft above rupture lines 30A. Thus, the operational path of the substantially vertical or upward occupant-seat ejection means will be cleared for escapement.

Certain modifications, alterations or changes may be resorted to without departing from the scope of the invention as defined in the appended claims.

I claim:

1. A rotor hub arrangement for aircraft having rotatable sustaining means, comprising
a hub construction having means for securement to a driving means and including a plurality of portions each having attachment means for connection of a corresponding part of said sustaining means thereto,
ballistic charge means embedded within said hub at predetermined locations, and
means for igniting said charge means,
so constructed and arranged that when an aircraft provided with said arrangement encounters insurmountable difficulties, said charge means may be ignited for demolition and discarding of said portions and their respective attachments, whereby sufficient clearance is provided for use of conventional occupant-seat ejection apparatus.

2. The rotor hub arrangement of claim 1 wherein pre-formed fracture lines are provided in said hub adjacent said charge means for precisely defining corresponding ends of said portions.

3. The rotor hub arrangement set forth in claim 1 in which said charge means are positioned adjacent hub areas intermediate said attachment means of adjacent portions and having durable yet a minimum of strength.

4. A rotor hub arrangement for helicopters and the like comprising
a hub construction having means for securement to a driving shaft and including a plurality of portions each having attachment means for connection of a rotor blade thereto,
a plurality of ballistic charges embedded within the outer periphery of said hub at least at angularly spaced locations, said charges substantially defining the extent of adjacent corresponding ends of said portions, and
means for igniting said charges,
so constructed and arranged that when a helicopter carrying said arrangement encounters insurmountabue difficulties, said charges may be ignited for demolition of said portions and discarding of their respective attachments, whereby sufficient clearance is provided for use of substantially vertically upward occupant-seat ejection apparatus.

5. The rotor hub arrangement defined in claim 4 wherein pre-formed fracture lines are provided in said hub adjacent said charges for precisely defining the corresponding ends of said portions.

6. The rotor hub arrangement set forth in claim 4 in which said ballistic charges are selectively positioned adjacent sub areas intermediate said attachment means of adjacent portions and having durable yet a minimum of strength.

7. A rotor hub arrangement for aircraft having upwardly directed occupant-seat ejection means and rotatable sustaining means normally obstructing the operational path of said ejection means, comprising
a hub construction having means for attaching said sustaining means thereto and means for maintaining said hub in driven engagement by a drive means,
ballistic charge means for removing said maintaining and attaching means, and
means for igniting said charge means,
so constructed and arranged that when an aircraft, provided with said arrangement, becomes disabled in an emergency its sustaining means may be rapidly removed to provide clearance for said ejection means.

8. In a helicopter having a rotor hub operatively connected to a drive shaft and a plurality of rotor blades each affixed to respective portions of said hub,
ballistic charge means carried by said hub at predetermined locations, for effecting dismemberment of said blades from said helicopter and
means for igniting said charge means,
so constructed and arranged that when said helicopter encounters insurmountable difficulties, said charge means may be ignited for demolition of said hub portions and discarding of their corresponding blades, whereby sufficient clearance is provided for use of conventional occupant-seat ejection apparatus.

9. The combination of claim 8 in which said hub is provided with pre-formed fracture lines adjacent said charge means for precisely defining corresponding ends of said hub portions.

10. The combination of claim 8 in which a minimum quantity of ballistic charge means is provided to fracture said hub intermediate the adjacent portions thereof, and the centrifugal force produced by said rotor blades completes dismemberment of said portions and corresponding blades.

11. The combination of claim 8 in which said charge means are positioned adjacent hub areas intermediate said blade affixed portions and said hub areas having durable yet a minimum of strength.

12. In an aircraft having substantially vertically upward occupant-seat ejection means, and rotatable sustaining means normally obstructing the operational path of said ejection means,
means for driving said rotatable sustaining means, and
ballistic charge means within said drive means for rapid removal of said rotatable sustaining means to clear said path for emergency actuation of said ejection means.

13. A rotor hub arrangement for aircraft having rotatable sustaining means, comprising
   a hub construction having means for attaching said sustaining means thereto,
   a rotor shaft,
   means for drivingly engaging said hub with said shaft,
   thrust restraining means for normally maintaining said hub upon said shaft,
   ballistic charge means for exerting a substantial axial force upon said thrust restraining means, and
   means for igniting said charge means,
   so constructed and arranged that when an aircraft provided with said arrangement encounters insurmountable difficulties, said charge means may be ignited to render said thrust restraining means ineffective and enable rapid removal of said hub and sustaining means, whereby sufficient clearance is provided for use of conventional occupant-seat ejection apparatus.

14. In an aircraft having upwardly directed occupant-seat ejection means and rotatable sustaining means normally obstructing the operational path of said ejection means,
   a hub carrying said sustaining means,
   a rotor shaft,
   means for drivingly engaging said hub with said shaft,
   end thrust restraining means for normally maintaining said hub upon said shaft,
   ballistic charge means for exerting a substantial axial force upon said restraining means, and
   means for igniting said charge means,
   so constructed and arranged that upon emergency ignition of said charge means, said restraining means is rendered ineffective to enable rapid removal of said hub and sustaining means and clear said path for emergency actuation of said ejection means.

References Cited by the Examiner

UNITED STATES PATENTS

| | | | |
|---|---|---|---|
| 2,657,880 | 11/1953 | Bannister | 244—139 X |
| 2,777,655 | 1/1957 | Graham | 244—135 |
| 2,998,213 | 8/1961 | Pitts | 244—141 X |

MILTON BUCHLER, *Primary Examiner.*

L. C. HALL, *Assistant Examiner.*